(12) United States Patent
Findlay

(10) Patent No.: US 10,438,165 B2
(45) Date of Patent: Oct. 8, 2019

(54) PLANOGRAM GENERATION

(71) Applicant: Roland Findlay, San Jose, CA (US)

(72) Inventor: Roland Findlay, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 15/452,554

(22) Filed: Mar. 7, 2017

(65) Prior Publication Data
US 2018/0260767 A1 Sep. 13, 2018

(51) Int. Cl.
*G06Q 10/08* (2012.01)

(52) U.S. Cl.
CPC .................. *G06Q 10/087* (2013.01)

(58) Field of Classification Search
CPC .................................. G06Q 10/087
See application file for complete search history.

(56) References Cited

U.S. PATENT DOCUMENTS

| | | | | |
|---|---|---|---|---|
| 8,189,855 | B2 * | 5/2012 | Opalach | G06Q 10/087 382/100 |
| 2008/0306787 | A1 * | 12/2008 | Hamilton | G06Q 10/06 705/7.38 |
| 2009/0059270 | A1 * | 3/2009 | Opalach | G06K 9/00 358/1.15 |
| 2009/0063306 | A1 * | 3/2009 | Fano | G06K 9/00 705/28 |
| 2014/0003729 | A1 * | 1/2014 | Auclair | G06K 9/6292 382/224 |
| 2015/0123973 | A1 * | 5/2015 | Larsen | G06T 15/04 345/427 |
| 2016/0224857 | A1 * | 8/2016 | Zhang | G06K 9/00771 |
| 2016/0335590 | A1 * | 11/2016 | Hassan | G06Q 10/087 |
| 2017/0178061 | A1 * | 6/2017 | Griffin | G06Q 10/087 |
| 2017/0178227 | A1 * | 6/2017 | Graham | G06Q 30/0643 |
| 2017/0178310 | A1 * | 6/2017 | Gormish | G06K 9/52 |
| 2017/0193430 | A1 * | 7/2017 | Barreira Avegliano | G06Q 10/087 |
| 2017/0286901 | A1 * | 10/2017 | Skaff | G06Q 10/087 |
| 2018/0005176 | A1 * | 1/2018 | Williams | G06Q 10/087 |
| 2018/0068256 | A1 * | 3/2018 | Marder | G06Q 10/087 |
| 2018/0101813 | A1 * | 4/2018 | Paat | G06Q 10/087 |
| 2018/0232688 | A1 * | 8/2018 | Pike | G06Q 10/087 |

OTHER PUBLICATIONS

G. Varol and R. S. Kuzu. "Toward Retail Product Recognition on Grocery Shelves." In International Conference on Graphic and Image Processing, 2015. (Year: 2015).*

(Continued)

*Primary Examiner* — Nathan A Mitchell
(74) *Attorney, Agent, or Firm* — Patent Law Works LLP

(57) ABSTRACT

A system and method that generates a planogram from a realogram is disclosed. The method includes receiving, from an image processing module, a realogram, the realogram including an image and information about a set of items recognized in the image, generating a bounding box containing the set of recognized items, identifying a subset of the set of recognized items corresponding to a shelf, determining a location of each gap of a number of gaps on the shelf, determining a physical width of each gap of the number of gaps, and generating, from the realogram, a planogram based on the bounding box, the set of recognized items, the location, and the physical width of each of the number of gaps.

20 Claims, 12 Drawing Sheets

(56) References Cited

OTHER PUBLICATIONS

S. Liu and H. Tian. "Planogram Compliance Checking using Recurring Patterns." In 2015 IEEE International Symposium on Multimedia. 2015. (Year: 2015).*

Frontoni, E., Mancini, A., Zingaretti, P.: Embedded vision sensor network for planogram maintenance in retail environments. Sensors 15(9), 21114-21133 (2015) (Year: 2015).*

M. Marder et al., "Using Image Analytics to Monitor Retail Store Shelves", IBM Journal of Research and Development, vol. 59, No. 2/3, pp. 3:1-3:11, Mar. 2015. (Year: 2015).*

A. Saran, E. Hassan, A.K. Maurya. "Robust visual analysis for planogram compliance problem". Proceedings of MVA'15, IEEE (2015), pp. 576-579 (Year: 2015).*

* cited by examiner

| Image | Product | UPC | Facing | Height | Width | ... | Price |
|-------|---------|-----|--------|--------|-------|-----|-------|
| img1 | Xtoothpaste | 000350074... | Front | 7.80 | 2.05 | ... | $3.99 |
| img2 | Ytoothpaste | 003500072... | Front | 7.80 | 2.05 | ... | $2.49 |
| img3 | Ztoothpaste | 002755500... | Front | 7.80 | 2.05 | ... | $1.89 |
| img4 | A1fresh | 002748505... | Front | 7.80 | 4.00 | ... | $4.69 |
| img5 | YGel | 003500073... | Front | 9.00 | 4.05 | ... | $3.59 |
| img6 | Xsmile | 002370874... | Front | 7.80 | 2.05 | ... | $2.40 |
| ... | ... | | ... | ... | ... | | ... |

PLANOGRAM GENERATION

BACKGROUND

Field of the Invention

The specification generally relates to generating a planogram for representing a structured positioning of items on shelves. In particular, the specification relates to a system and method for generating a planogram based on a realogram of items on shelves in a retail store.

Description of the Background Art

A planogram is a data or visual representation of products in a retail environment. For example, a planogram may describe where in the retail environment and in what quantity products should be located. Such planograms are tools designed for increasing sales, managing inventory and otherwise ensuring that the desired quantity and sizes of an item are placed to optimize, for example, profits. However, such planograms may not readily be available or used in some retail situations. Some retail stores may present and maintain adequate levels of stock on shelves, racks and display stands without enforcing a planogram and be highly successful in moving more items than average without knowing why. While the location and quantity of products in the retail stores can be manually tracked by a user, attempts are being made to automatically recognize the products and automatically or semi-automatically obtain information about the state of products in order to generate an optimized planogram that can be put to use.

Previous attempts at generating planograms have deficiencies. For example, one method is to place cameras in stores and watch customer behavior to develop customer driven planograms. In another example, one method is to send representatives into retail stores to create planograms manually with pen and paper. Unfortunately, planograms developed through such methods can be time consuming, unreliable, and impact the sales performance negatively.

SUMMARY

The techniques introduced herein overcome the deficiencies and limitations of the prior art, at least in part, with a system and method for generating a planogram. In one embodiment, the system includes one or more processors and a memory storing instructions which when executed cause the one or more processors to: receive a realogram including an image and information about a set recognized items in the image; generate a bounding box containing the set of recognized items; identify a subset of the set of recognized items corresponding to a shelf; determine a location of each gap of a number of gaps on the shelf; determine a physical width of each gap of the number of gaps; and generate, from the realogram, a planogram based on the bounding box, the set of recognized items, the location, and the physical width of each of the number of gaps.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 4A-4C are graphical representations of one embodiment of a user interface for validating and adjusting a planogram.

DETAILED DESCRIPTION

Figure 1:
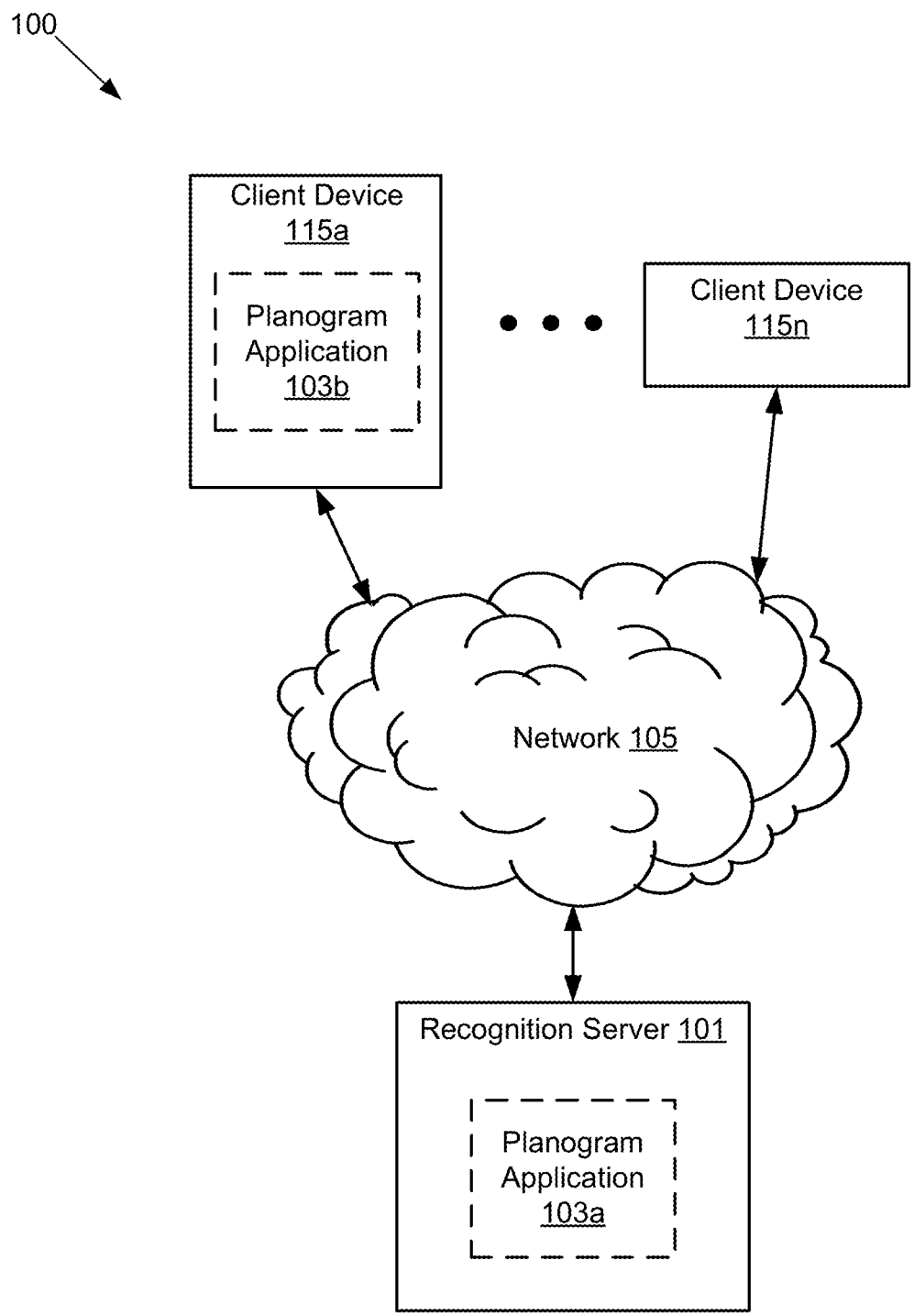
FIG. 1 is a high-level block diagram illustrating one embodiment of a system for generating a representative planogram.

FIG. 1 is a high-level block diagram illustrating one embodiment of a system 100 for generating a representative planogram. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement a planogram application 103a described in more detail below. In one embodiment, the recognition server 101 provides services to a consumer packaged goods (CPG) firm for identifying products on shelves, racks, or displays and determining a structured way to arrange a placement of the products. While the examples herein describe recognition of products in an image of shelves, such as a retail display, it should be understood that the image may include any arrangement of organized objects or items. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a web site or an email, or an image from any other source. Although only a single recognition server 101 is shown in FIG. 1, it should be understood that there may be any number of recognition servers 101 or a server cluster. The recognition server 101 may include data storage.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a captured image to the recognition server 101 and the recognition server 101 provides data in JavaScript Object Notation (JSON) format about one or more objects recognized in the captured image to the client device 115. The client device 115 may support use of graphical application program interface (API) such as Metal on Apple iOS™ or RenderScript on Android™ for determination of feature location and feature descriptors during image processing.

The planogram application 103 may include software and/or logic to provide the functionality for generating a representative planogram. In some embodiments, the planogram application 103 can be implemented using programmable or specialized hardware, such as a field-programmable gate array (FPGA) or an application-specific integrated circuit (ASIC). In some embodiments, the planogram application 103 can be implemented using a combination of hardware and software. In other embodiments, the planogram application 103 may be stored and executed on a combination of the client devices 115 and the recognition server 101, or by any one of the client devices 115 or recognition server 101.

In some embodiments, the planogram application 103b may be a thin-client application with some functionality executed on the client device 115 and additional functionality executed on the recognition server 101 by the planogram application 103a. For example, the planogram application 103b on the client device 115 could include software and/or logic for capturing an image, transmitting the image to the recognition server 101, and displaying image recognition results. In another example, the planogram application 103a on the recognition server 101 could include software and/or logic for receiving a series of images, stitching the images into a larger composite image based on each received image having sufficient overlap with a previously received image in the series, and generating image recognition results for the composite image. In yet another example, the planogram application 103a on the recognition server 101 could include software and/or logic for generating a planogram from the image recognition results. The planogram application 103a or 103b may include further functionality described herein, such as, processing the image and performing feature identification.

In some embodiments, the planogram application 103 receives a realogram of items on a set of shelves. The planogram application 103 generates a bounding box containing the set of recognized items. The planogram application 103 identifies a subset of the set of recognized items corresponding to a shelf. The planogram application 103 determines a location of each gap of a number of gaps on the shelf. The planogram application 103 determines a physical width of each gap of the number of gaps. The planogram application 103 generates, from the realogram, a planogram based on the bounding box, the set of recognized items, the location, and the physical width of each of the number of gaps. The operation of the planogram application 103 and the functions listed above are described below in more detail below with reference to FIGS. 3-6.

Figure 2:
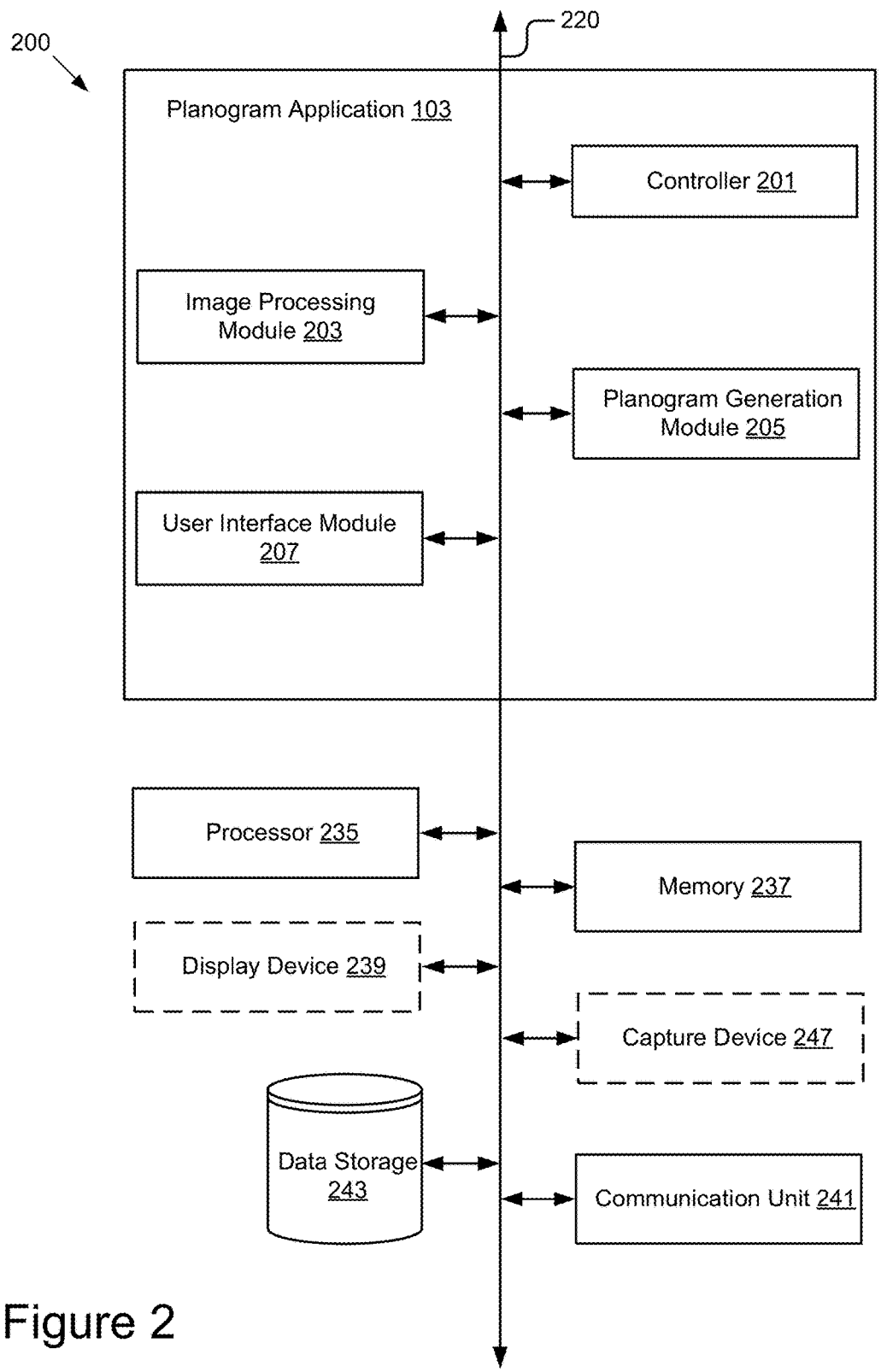
FIG. 2 is a block diagram illustrating one embodiment of a computing device including a planogram application.

FIG. 2 is a block diagram illustrating one embodiment of a computing device 200 including a planogram application 103. The computing device 200 may also include a processor 235, a memory 237, an optional display device 239, a communication unit 241, data storage 243, and an optional capture device 247 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the planogram application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the planogram application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including recognition results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store a database table or templates for a plurality of stock keeping units for image recognition purposes. A stock keeping unit (SKU) is a distinct item, such as a product offered for sale. The database table includes all attributes that makes the item distinguishable as a distinct product from all other items. For example, the attributes include a unique identifier (e.g., Universal Product Code (UPC)), product name, physical dimensions (e.g., width, height, depth, etc.), size (e.g., liters, gallons, ounces, pounds, kilograms, fluid ounces, etc.), facing side (e.g., front, back, side, top, bottom, etc.), description, brand manufacturer, color, packaging version, material, model number, price, discount, base image, etc. The term stock keeping unit or SKU may also refer to a unique identifier that refers to the particular product or service in the inventory. In some embodiments, the data storage 243 stores a received image, the set of features determined for the received image, and a realogram associated with the received image. The data storage 243 may similarly store one or more planograms. Additionally, the data storage 243 may store datasets used in evaluating the one or more planograms. The data stored in the data storage 243 is described below in more detail.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera, or a wearable computing device. The capture device 247 is coupled to the bus to provide the images and other processed metadata to the processor 235, the memory 237, or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below with reference to FIGS. 3A-3D.

In some embodiments, the planogram application 103 may include a controller 201, an image processing module 203, a planogram generation module 205, and a user interface module 207. The components of the planogram application 103 are communicatively coupled via the bus 220. The components of the planogram application 103 may each include software and/or logic to provide their respective functionality. In some embodiments, the components of the planogram application 103 can each be implemented using programmable or specialized hardware including a field-programmable gate array (FPGA) or an application-specific integrated circuit (ASIC). In some embodiments, the components of the planogram application 103 can each be implemented using a combination of hardware and software executable by the processor 235. In some embodiments, the components of the planogram application 103 may each be stored in the memory 237 and be accessible and executable by the processor 235. In some embodiments, the components of the planogram application 103 may each be adapted for cooperation and communication with the processor 235, the memory 237, and other components of the planogram application 103 via the bus 220.

The controller 201 may include software and/or logic to control the operation of the other components of the planogram application 103. The controller 201 controls the other components of the planogram application 103 to perform the methods described below with reference to FIGS. 5-6. The controller 201 may also include software and/or logic to provide the functionality for handling communications between the planogram application 103 and other components of the computing device 200 as well as between the components of the planogram application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 207 and sends the data to a client device 115, causing the client device 115 to present the user interface to the user.

In some embodiments, the controller 201 receives data from other components of the planogram application 103 and stores the data in the data storage 243. For example, the controller 201 receives data including features identified for an image from the image processing module 203 and stores the data in the data storage 243. In other embodiments, the controller 201 retrieves data from the data storage 243 and sends the data to other components of the planogram application 103. For example, the controller 201 retrieves data including an item or product from the data storage 243 and sends the retrieved data to the planogram generation module 205.

In some embodiments, the communications between the planogram application 103 and other components of the computing device 200 as well as between the components of the planogram application 103 can occur autonomously and independent of the controller 201.

The image processing module 203 may include software and/or logic to provide the functionality for receiving and processing one or more images of shelves from the client device 115. For example, the images may be images depicting a current layout of items on a set of shelves in one or more retail stores. If a planogram for the set of shelves is not available or up-to-date, the images serve as a starting point in determining a corresponding representative planogram.

In some embodiments, the image processing module 203 receives one or more images of a set of shelves from the client device 115. The images may be received for recognition and may include multiple items of interest. For example, the image can be an image of packaged products on a set of shelves (e.g., coffee packages, breakfast cereal boxes, soda bottles, etc.) which reflects a real-time placement and movement of packaged products on the shelves inside a retail store. A packaged product of a brand manufacturer may include textual and pictorial information printed on its surface that distinguishes it from packaged products belonging to one or more other brand manufacturers. The packaged products may also sit in an orientation on the shelf exposed to the user looking at the shelf. For example, a box-like packaged product might be oriented with the front, the back, the side, the top, or the bottom of the product exposed to the user looking at the shelf In some embodiments, the image processing module 203 determines whether successful recognition is likely on the received image and instructs the user interface module 207 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc. In some embodiments, the image processing module 203 may receive a sequence of individual and sufficiently overlapping images of the set of shelves. For example, the overlap between the individual images can be 40%. The image processing module 203 stitches the individual images into a single linear panoramic image (e.g., a composite image) and performs image recognition on the stitched image.

In some embodiments, the image processing module 203 determines a set of features for the image. For example, the image processing module 203 may determine a location (X-Y coordinates), an orientation, and an image descriptor for each feature identified in the image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature description algorithms for determining efficient image feature descriptors. For example, the feature description algorithms may include Binary Robust Independent Elementary Features (BRIEF), Scale-Invariant Feature Transform (SIFT), etc. An image descriptor of a feature may be a 256-bit bitmask which describes the image sub-region covered by the feature. In some embodiments, the image processing module 203 may compare each pair of 256 pixel pairs near the feature for intensity and based on each comparison, the image processing module 203 may set or clear one bit in the 256-bit bitmask.

In some embodiments, the image processing module 203 matches the features of the image with the features of templates associated with a plurality of items for performing image recognition. For example, the image processing module 203 uses the database table for products in the data storage 243 for analyzing the features of the image. The image processing module 203 identifies a region of interest (ROI) bordering each of the matched items in the image. A region of interest can be of any shape, for example, a polygon, a circle with a center point and a diameter, a rectangle having a width, a height and one or more reference points for the region (e.g., a center point, one or more corner points for the region), etc. For example, the region of interest may be a recognition rectangle bordering the matched item in its entirety. In another example, the region of interest may border the exposed label containing pictorial and textual information associated with the matched item.

In some embodiments, the image processing module 203 recognizes an item or product associated with the region of interest based on matching the image features from the image with the template features stored for a plurality of items. Symbolic information or metadata is determined in association with a recognition result for an identified item by the image processing module 203, and the symbolic information may include a Universal Product Code (UPC), position (e.g., position in relative X-Y coordinates, a slot position on a shelf, a particular shelf off the ground, etc.), facing side (e.g., top, bottom, front, back, or side) and dimensions (e.g., width, height, etc.) of the region of interest, and other metadata (e.g., packaging version).

In some embodiments, the image processing module 203 determines the coordinate position and the dimensions of the item recognized in the image in relative units. For example, the image processing module 203 recognizes that there is an item located at (X, Y) coordinates and that the item has 'Z' width, both of which is expressed relative to the image as a whole. In some embodiments, the image processing module 203 also determines the dimensions of the empty space among the recognized items on a shelf in relative units. For example, the image processing module 203 determines a relative width of a gap in the shelf. In one embodiment, the relative units are floating point numbers that range between '0' and '1'. The value '1' represents a full width or height of the image, whichever is larger. For example, an image of the set of shelves is rectangular in shape. In this case, the value '1' represents the side of the image having the longest dimension and the scale remains consistent in the X and Y axes of the coordinate system of relative units. The relative units do not correspond to physical dimensions, such as inches.

In some embodiments, the image processing module 203 determines a realogram of the items on shelves based on the image. The realogram includes the symbolic information of the plurality of non-contiguous items recognized in the image. In some embodiments, the image processing module 203 sends data including the realogram to the planogram generation module 205. In other embodiments, the image processing module 203 stores the data including the realogram in the data storage 243.

The planogram generation module 205 may include software and/or logic to provide the functionality for generating a representative planogram. In some embodiments, the planogram generation module 205 receives the realogram including recognition results for items matched in the image from the image processing module 203. In some embodiments, the realograms may be associated with a single retail store or multiple retail stores. In some embodiments, the planogram generation module 205 generates a planogram by normalizing the realogram, as described in more detail below.

Figure 3A:
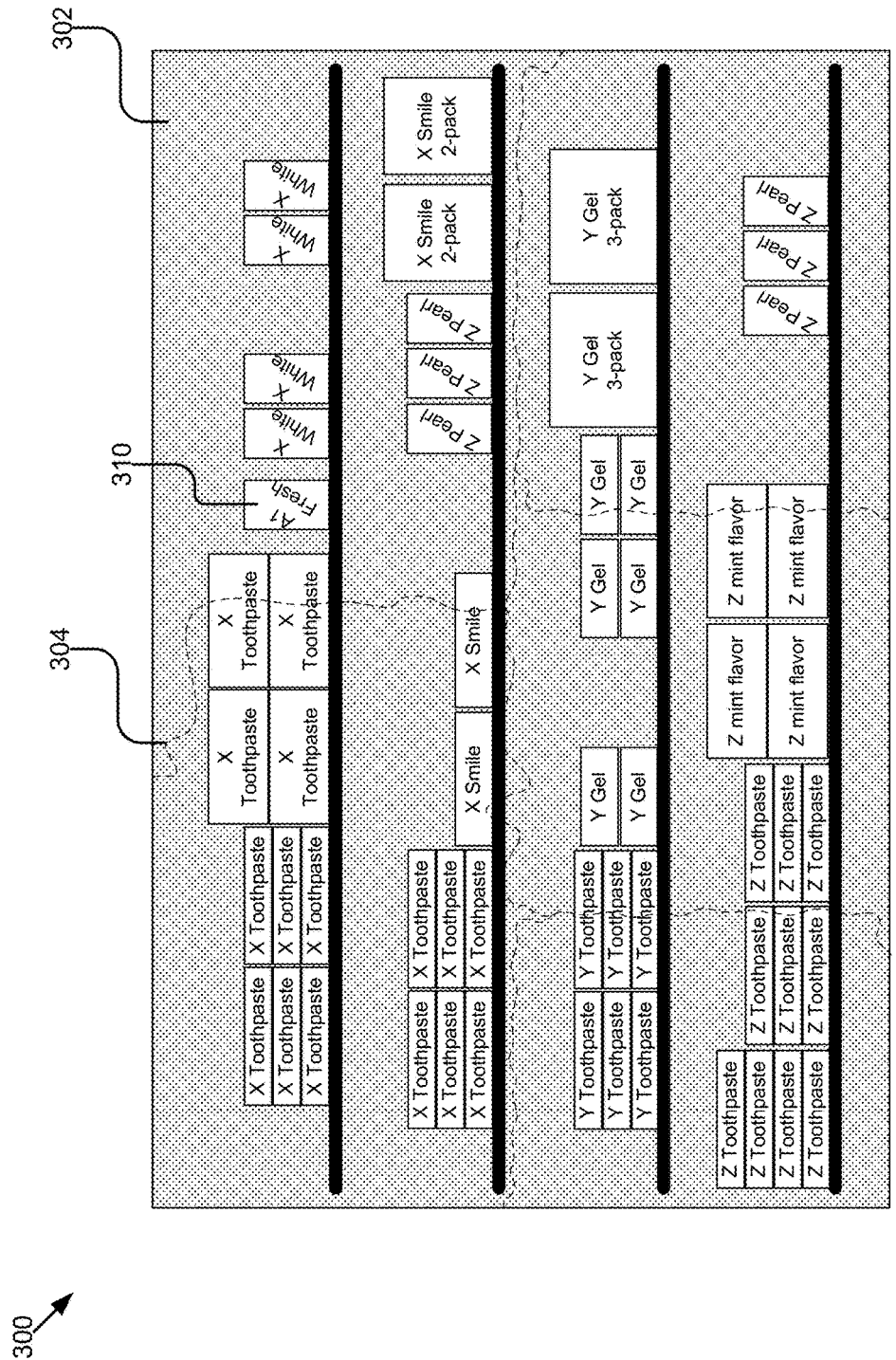
FIG. 3A-3D are graphical representations of one embodiment of a process for generating a representative planogram from a realogram of items on shelves.

The planogram generation module 205 generates a planogram by executing a series of normalization steps on the realogram(s) including the recognition results. As shown in the example of FIGS. 3A-3D, the graphical representations illustrate one embodiment of a process for generating a representative planogram from a realogram. In FIG. 3A, the graphical representation 300 includes a realogram 302 of items on shelves. The realogram 302 is a stitched image from multiple individual images that are overlapping. There can be geometric distortion and other artifacts visible in the realogram 302 as shown by the dotted line 304. The geometric distortion is due to the fact that the position of the client device 115 with respect to the shelves varies every time an individual image is captured by the client device 115 and stitched into the composite image. The physical dimensions of one or more shelves are unknown in the realogram 302. In other embodiments, the realogram 302 can be a single image as it is without any distortion.

Figure 3B:
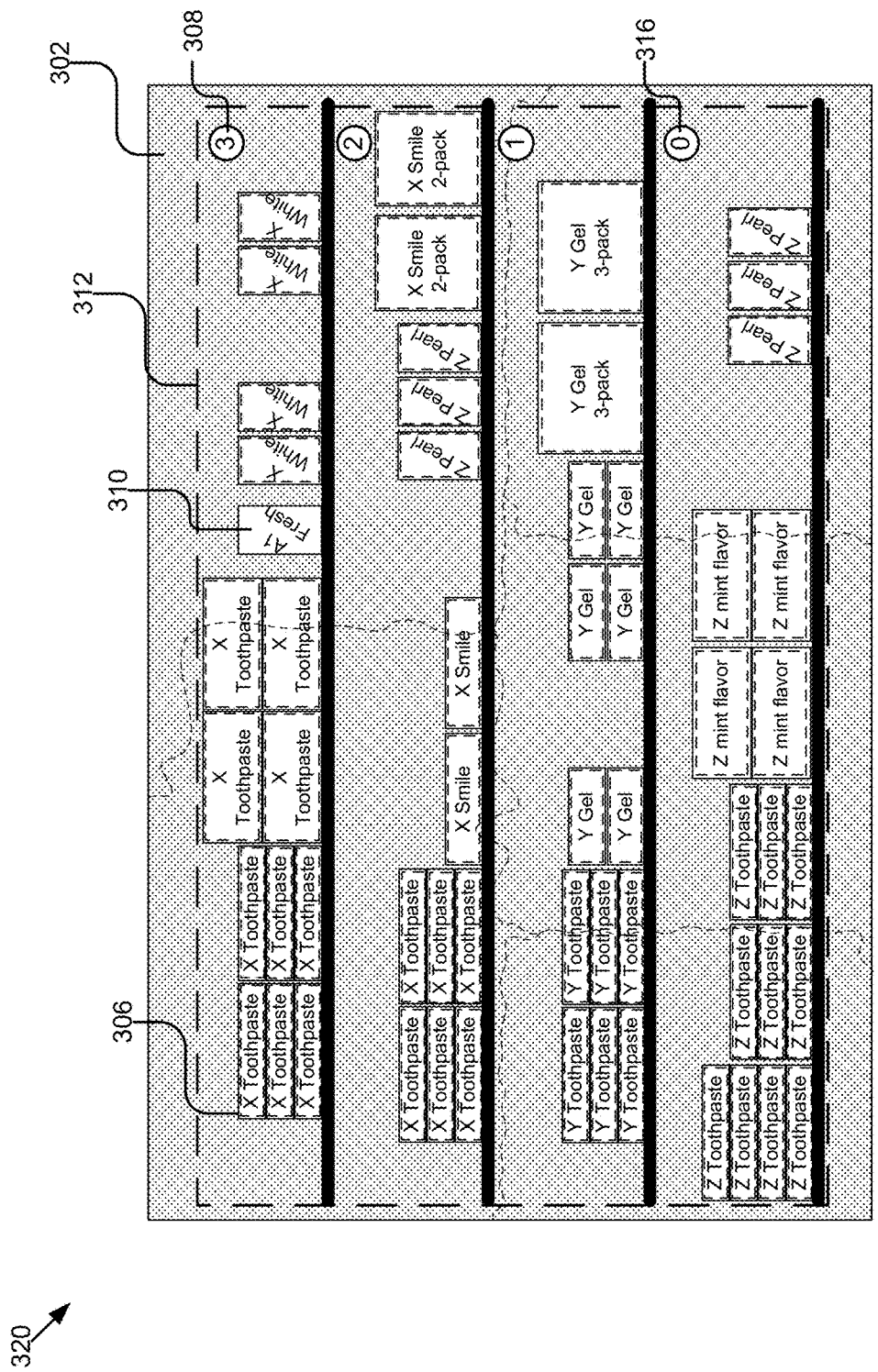

In some embodiments, the planogram generation module 205 identifies a plurality of facings in the realogram 302 based on the recognition results of the items. A facing can be a vertical stacking of one or more items on a shelf turned out towards the customer. For example, a set of toothpaste products, each in a box-like package, may be stacked on top of one another to form a facing at a single position of the shelf. The one or more items in the facing are designed to represent an identical product (or same SKUs). As shown in the example of FIG. 3B, the graphical representation 320 illustrates a version of the realogram 302 highlighting each of the recognized items. The graphical representation 320 shows a facing 306 containing a stack of "X Toothpaste" items on the top-most shelf 308 in the realogram 302. Recognized items in the realogram are associated with a region of interest that corresponds to the location (e.g., in relative X-Y coordinates) of the recognized item in the realogram. As depicted in the example of FIG. 3B, the region of interest corresponding to recognized items is indicated by a dashed line roughly corresponding to the outline of the item. A facing may include multiple regions of interest corresponding to multiple items in the facing (e.g., facing 306) or a facing may include a single region of interest. However, if there is an item that is unrecognized, the item may not have a corresponding region of interest (e.g., depicted in the example of FIG. 3A as an item with no corresponding dashed line), as shown for the unrecognized item 310 in FIG. 3A and FIG. 3B. An item may go unrecognized by the image processing module 203 for several reasons. For example, the image features determined for the item may not be sufficient for recognition due to distortion present in the image. In another example, the item may be a new item not yet indexed into the product database in the data storage 243. Also, if the items get misplaced on the shelves, the facing may become mixed. For example, a toothpaste brand 'X' may be misplaced on top of the toothpaste brand 'Y' in the facing meant for the toothpaste brand 'Y' and thus the facing can become a mixed facing.

In some embodiments, the planogram generation module 205 identifies that a horizontal linear grouping of one or more facings corresponds to a shelf (e.g., a linear group). In some embodiments, the planogram generation module 205 numbers the shelves in the realogram. As shown in the example of FIG. 3B, the planogram generation module 205 identifies the shelves from bottom to top with the bottom-most shelf 316 identified as '0' and the top-most shelf 308 identified as '3.' Other forms of identification of the shelves may be possible. For example, the planogram generation module 205 may number the shelves from top to bottom.

Assuming that the scene depicted by the realogram has a set of shelves that are all of the same length and that there is at least one shelf having an item located close to the edge of that shelf, the planogram generation module 205 generates a bounding box to contain the set of recognized items in the realogram. As shown in the example of FIG. 3B, the graphical representation 320 illustrates a bounding box 312 containing all of the recognized items in the realogram 302. The bounding box 312 is a geometric union of the regions of interest or recognition rectangles of the set of recognized items in the realogram 302. The planogram generation module 205 specifies the coordinates and dimensions of the bounding box in the same coordinate system of relative units as described above in reference to the recognized items. As will be described below in detail, the bounding box is used to estimate the gaps at the ends of the shelf in the realogram and preserve the fidelity of the gaps in the representative planogram.

Typically, a planogram may have one item represented at each position on the set of shelves. That is, a planogram does not display a stack of items as a facing. Rather, the planogram displays only a single image of an item representing the stack. In the process of generating a representative planogram, in some embodiments, the planogram generation module 205 identifies a confidence score of the recognition associated with one or more matched items in a facing. The planogram generation module 205 uses the confidence scores to determine a best recognition to assign to each of the plurality of facings present in the realogram.

In some embodiments, the planogram generation module 205 determines a recognition to assign to a facing based on the number of recognitions for each item in the facing. For example, if there are three items stacked in a mixed facing, the planogram generation module 205 identifies that recognition result for two of the items relate to a stock keeping unit (SKU) "X Toothpaste" and a recognition result for one of the items to a SKU "Y Toothpaste." The planogram generation module 205 performs a weighting of the recognition associated with the three items within the facing and determines SKU "Toothpaste X" as the most likely recognition of each item in the facing. In other embodiments, the planogram generation module 205 uses an identity of the recognized items in neighboring facings to verify which candidate recognition of an item to recommend as the most likely item for a facing under consideration.

In some embodiments, the planogram generation module 205 associates the recognition for the identified facing to an item in the facing. For example, the planogram generation module 205 associates the recognition to an item at the bottom of the facing in the realogram. In some embodiments, the planogram generation module 205 removes other items from the identified facing in the realogram after a recognition of an item is applied to the facing. For example, the planogram generation module 205 removes items stacked on top of the item at the bottom of the identified facing in the realogram. In some embodiments, the planogram generation module 205 retrieves an image of the item corresponding to the best recognition from the product database in the data storage 243 and replaces the recognized item within the region of interest with the image of the retrieved item. For example, the planogram generation module 205 removes the pixel information within the region of interest, retrieves a copy of the image of the retrieved item, and slides the image into the region of interest.

Figure 3C:
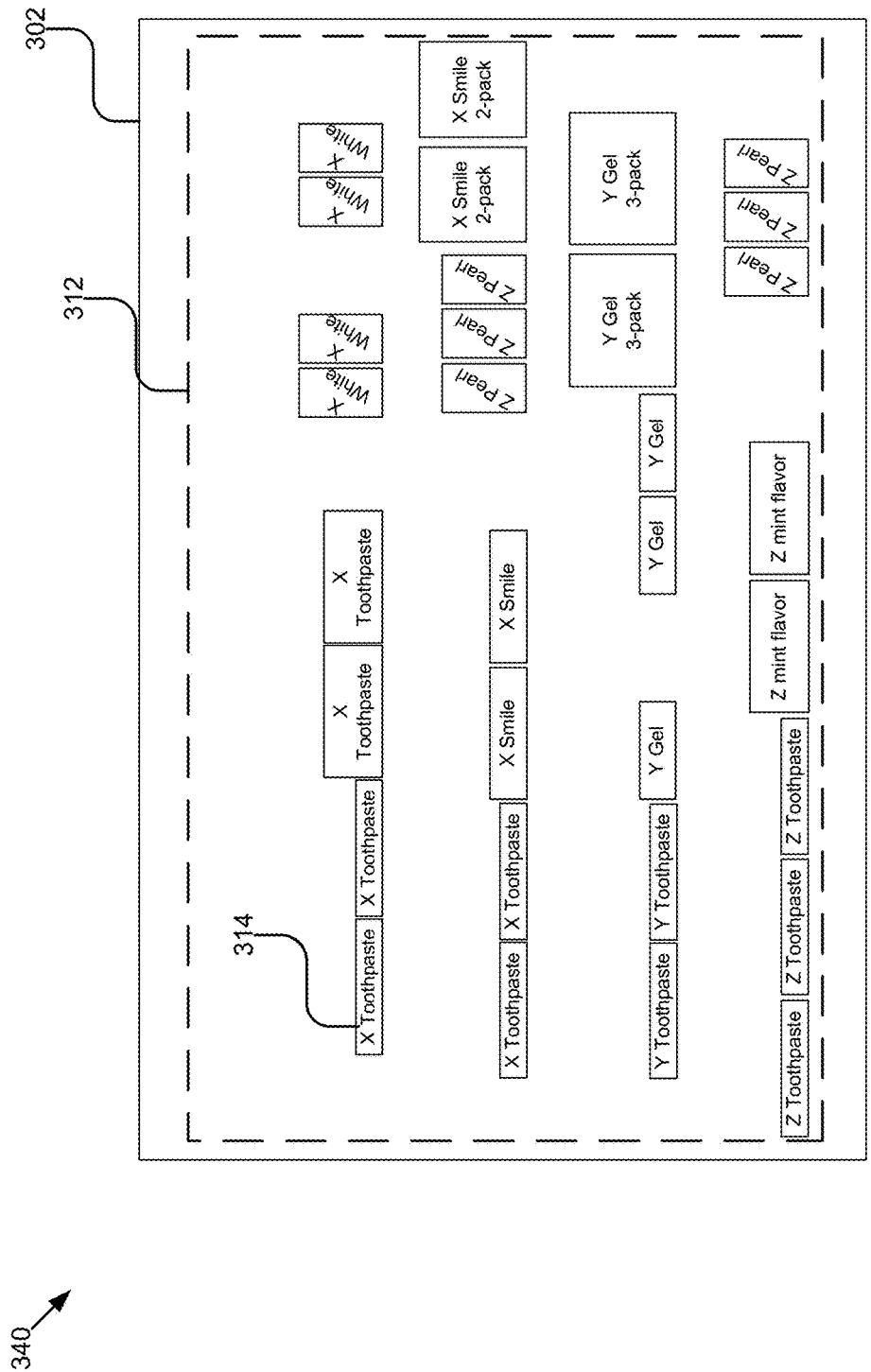

When a recognition is applied to the facings on a shelf, the recognitions may slightly become askew relative to each other and/or overlap with each other because of the distortion in the image as described earlier. For example, the recognition items (e.g., based on regions of interest associated with the items) belonging to a shelf can get out of vertical alignment with each other and overlap with other recognition items on the left and/or the right. In some embodiments, the planogram generation module 205 horizontally aligns the edges of items belonging to the shelf. For example, the planogram generation module 205 aligns the bottom edges of the items placed across the shelf. Other types of alignment for items may be possible. For example, if the items are hung from a hang tab on a shelf, the planogram generation module 205 aligns the top edges of the items. In some embodiments, the planogram generation module 205 resolves an overlap between the items on the shelf by moving the items minimally across the shelf such that the items are spaced apart and occupy non-overlapping positions. For example, the planogram generation module 205 shuffles the items horizontally such that the vertical edges of the items do not overlap with each other and are spaced apart from each other. The planogram generation module 205 determines the movement of the items such that the smallest number of the items may be subject to movement and the movement may be as minimal as possible. The planogram generation module 205 moves the items inwards from the left and right edges so as to establish a clear boundary for the overall planogram and to avoid moving the items beyond the bounding box. As shown in the example of FIG. 3C, the graphical representation 340 illustrates another version of the realogram 302 with just a single set of items 314 representing their corresponding facings 306 from the version of the realogram 302 depicted in FIG. 3B. This version of realogram 302 shows the individual recognized items with all non-recognized items removed. The items 314 are then moved inwards as minimally as possible without extending outside of the bounding box 312.

A planogram that is based on the realogram should be as close to the realogram as possible. The physical dimensions of the realogram and the gaps within the realogram are unknown. For the planogram to be accurate, it is preferable to determine the physical dimensions of the recognized items and the physical width of the gaps. The planogram generation module 205 generates a planogram that preserve the horizontal spacing and the gaps between the non-contiguous and sequentially placed items that are recognized on the set of shelves. A gap is a portion of the shelf that is devoid of recognition associated with an item. For example, the realogram may include an empty spot due to the customers having picked all the products from a stocked facing on the shelf when an image of the shelf was captured. In another example, the realogram may include an empty spot due to an unrecognized item on the shelf. In yet another example, the realogram may include empty spots at the beginning and/or at the end of the shelf. The planogram generation module 205 identifies each of those empty spots as potential horizontal gaps that should be preserved in the planogram.

In some embodiments, the planogram generation module 205 individually processes each shelf of the realogram for creating a representative planogram. This is done to minimize the effects of geometric distortion that may be present in the realogram.

The planogram generation module 205 identifies a subset of the set of recognized items in the realogram and associates the subset of the set of recognized items with a shelf in the realogram. The planogram generation module 205 determines a location (e.g., position in relative X-Y coordinates, a slot position on a shelf, a particular shelf off the ground, etc.) of a number of gaps before a first recognized item, among the subset of the set of recognized items, and following a last recognized item on the shelf. For example, the planogram generation module 205 determines a location of a gap between a left edge of the bounding box and a left edge of the first recognized item on the shelf In another example, the planogram generation module 205 determines a location of a gap between a right edge of a last recognized item on the shelf and a right edge of the bounding box. In yet another example, the planogram generation module 205 determines locations of a plurality of gaps among the subset of the set of recognized items that are intermediate between the first recognized item and the last recognized item on the shelf In some embodiments, the planogram generation module 205 generates a numbering of the gaps. For example, the planogram generation module 205 numbers the gaps from left to right (or right to left) of the shelf.

In some embodiments, the planogram generation module 205 determines a physical width of each gap of the number of gaps identified on the shelf in the realogram using a relative width and a corresponding physical width of one or more recognized items corresponding to the shelf.

The planogram generation module 205 receives the relative width of the one or more recognized items from the image processing module 203 and determines a total relative width for the shelf by summing the relative width of the one or more recognized items. The planogram generation module 205 receives recognition information associated with the one or more recognized items on the shelf from the image processing module 203. For example, the recognition information of an item includes a unique identifier, facing side, and packaging version. The planogram generation module 205 uses the recognition information of the one or more recognized items to look up the product database in the data storage 243 for specific dimensions. The planogram generation module 205 determines the corresponding physical dimensions of the one or more recognized items based on the look up. For example, each combination of a facing side and a packaging version of a recognized item can have its own set of dimensions. A first item identified with a front facing and a second item identified with a side facing, where the first and the second item are of the same UPC, will have two distinct physical widths associated with them. Similarly, a first item identified in a first packaging version and a second item identified in a second packaging version of the same UPC may have two distinct physical widths associated with them. The planogram generation module 205 determines a total physical width of the one or more items by summing the physical width of the one or more items. The planogram generation module 205 determines a relative-to-physical width ratio based on the total relative width and the total physical width.

In some embodiments, the planogram generation module 205 determines a total physical width by summing the physical width of each item of the subset of the set of recognized items corresponding to the shelf. The planogram generation module 205 determines a total relative width by summing the relative width of each item of the subset of the set of recognized items corresponding to the shelf. Then, the planogram generation module 205 determines the relative-to-physical width ratio based on the total physical width and the total relative width.

In some embodiments, the planogram generation module 205 receives a relative width of each gap of the number of gaps identified on the shelf in the realogram from the image processing module 203. The planogram generation module 205 determines the physical width of each gap of the number of gaps using the relative-to-physical width ratio and the relative width of each gap of the number of gaps.

In some embodiments, the planogram generation module 205 determines a gap threshold for a shelf. Some of the gaps in the realogram may result from imperfect spacing of the recognitions. The gap threshold describes a minimum gap width that is tolerable given the average size of the items on the shelf. The planogram generation module 205 determines an average physical width of the items on the shelf In some embodiments, the planogram generation module 205 determines the gap threshold as a percentage of the average physical width. For example, the gap threshold may be 30 percent to 50 percent of the average physical width of the items on the shelf. The planogram generation module 205 evaluates the physical width of each gap of the number of gaps on the shelf using the gap threshold. The planogram generation module 205 determines whether a physical width of a gap satisfies the gap threshold. If the physical width satisfies the gap threshold, the planogram generation module 205 identifies the gap as a legitimate gap. For example, the legitimate gap may be a gap that corresponds to a missing item or an unrecognized item on the shelf.

Figure 3D:
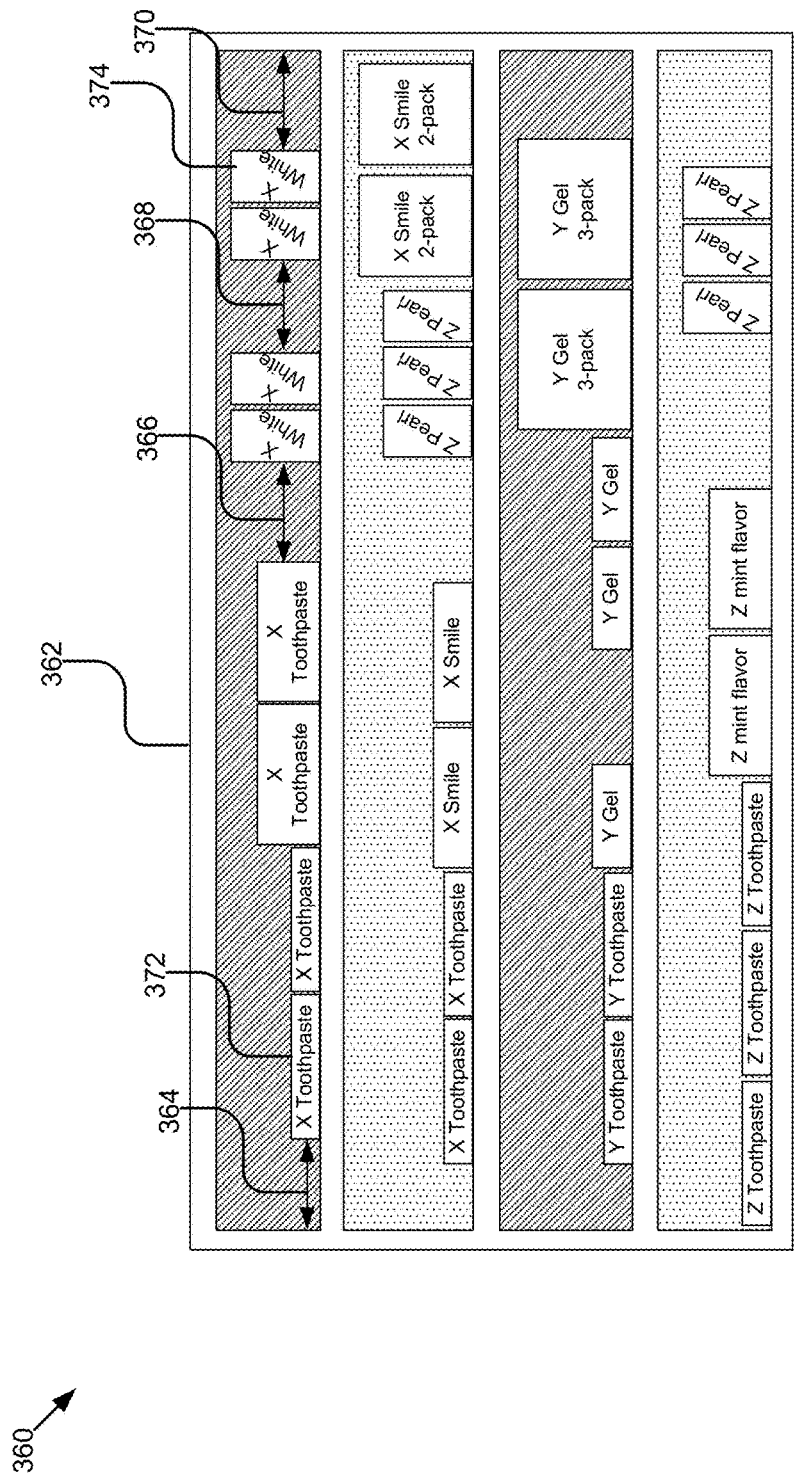

In some embodiments, the planogram generation module 205 generates a representative planogram from the realogram based on the bounding box, the set of recognized items and their corresponding physical dimensions, the location of the gaps and their corresponding physical widths. As shown in the example of FIG. 3D, the graphical representation 360 illustrates a display of the planogram 362 generated from the realogram 302 shown in FIGS. 3A-3C. The planogram displays a number of gaps 364-370 on a shelf of items. The gap 364 is identified before a first recognized item 372 and the gap 370 is identified after a last recognized item 374 on the shelf. The gaps 366 and 368 are identified among the subset of the recognized items on the shelf In some embodiments, the planogram can be symbolic. The planogram generation module 205 saves the planogram information in a file format that can be read back in to make changes to the planogram. For example, the planogram generation module 205 aggregates the product identifier, product name, brand, width, height, facing side, etc. in a comma-separated values (CSV) file to describe the planogram symbolically, where each line of the file corresponds to an item of the planogram.

Figure 4A:
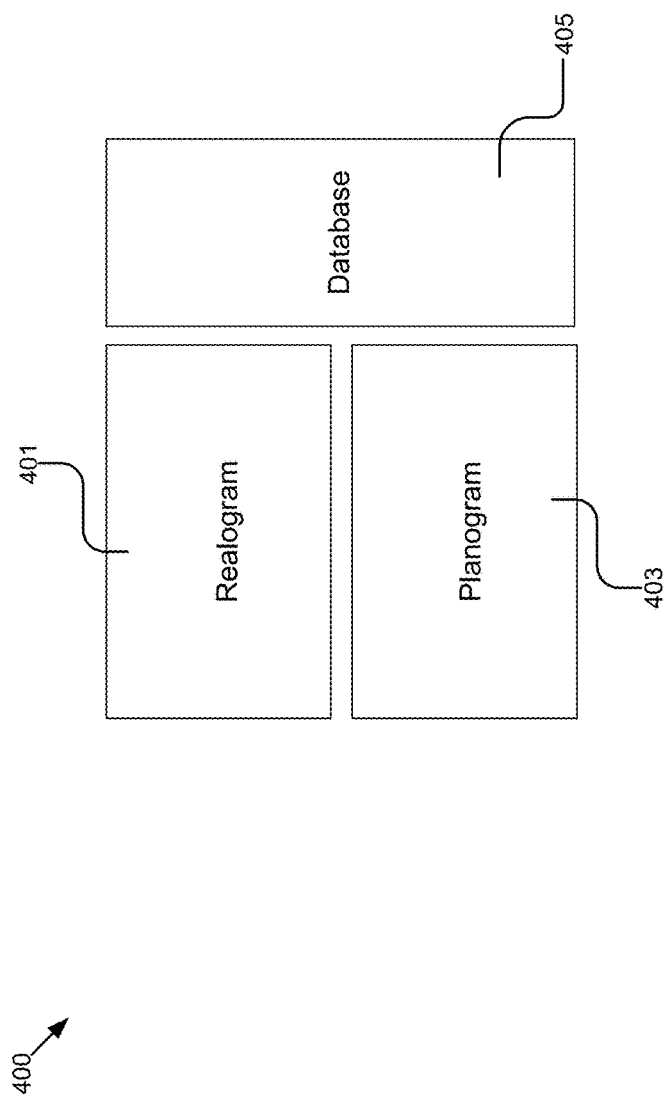
Figure 4B:
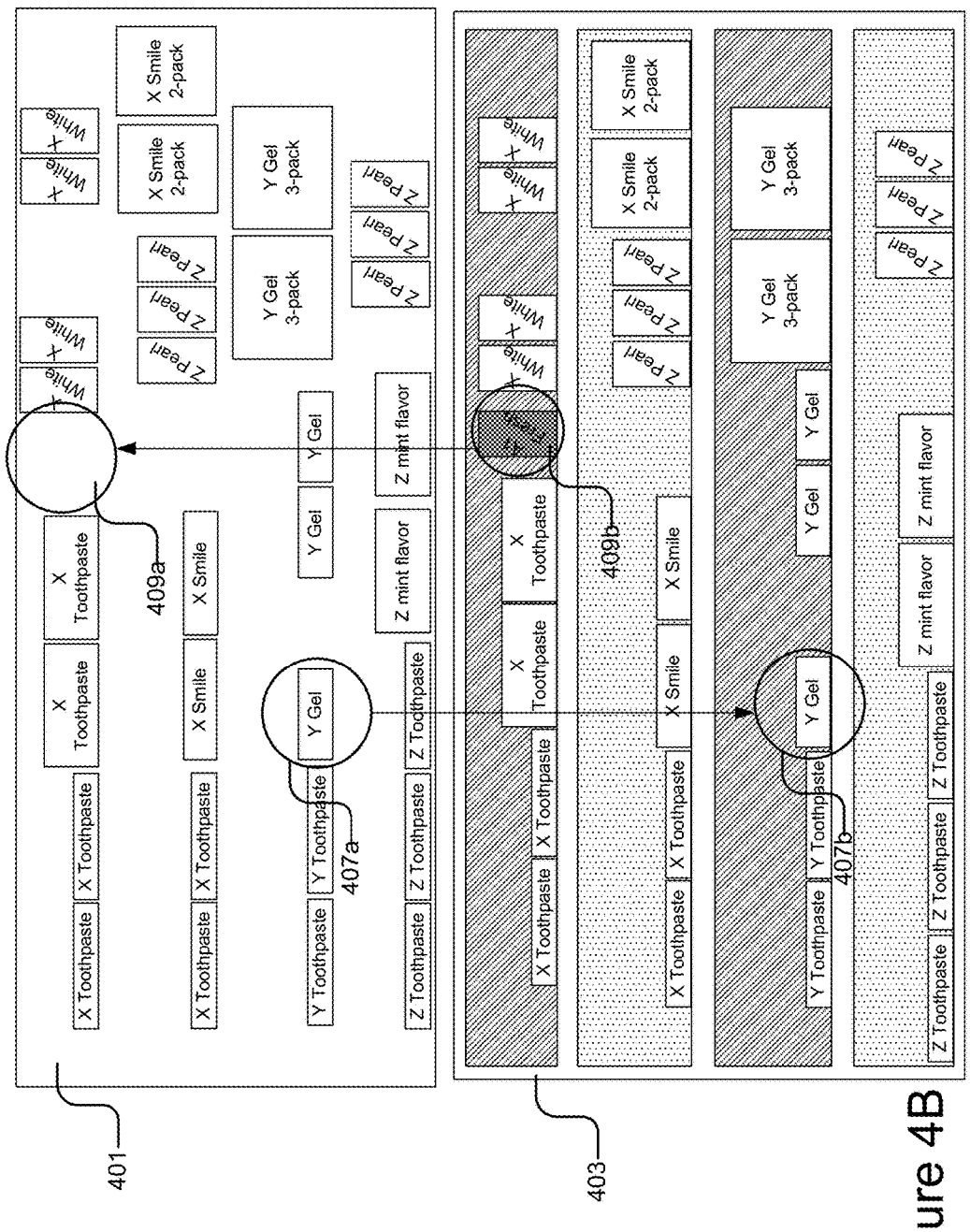

In some embodiments, the planogram generation module 205 sends instructions to the user interface module 207 to generate graphical data for displaying the realogram, the planogram generated by executing the above described series of normalization steps on the realogram, and a database. The display of the planogram provides a possible visualization that allows a user to further edit the generated planogram. For example, the user can be provided with graphical editing operations such as, drag and drop, cut and paste, and undo and redo for editing the generated planogram. As shown in the example of FIGS. 4A-4C, the graphical representations illustrate one embodiment of a user interface for validating and adjusting a planogram. In FIG. 4A, the graphical representation 400 illustrates a layout of different portions of the user interface for validating and adjusting the planogram. The graphical representation 400 includes a top pane for displaying a realogram 401, a bottom pane for displaying the corresponding planogram 403, and a right pane for displaying a tabular representation of the database 405. FIG. 4B illustrates an expanded view displaying a realogram 401 in a first portion of the user interface and the corresponding planogram 403 in a second portion of the user interface. FIG. 4C illustrates an expanded view displaying the tabular representation of the database 405 in a third portion of the user interface.

In some embodiments, the planogram generation module 205 receives a user input to modify the planogram and the planogram generation module 205 updates the planogram accordingly based on the user input. For example, the planogram generation module 205 receives a user request to move an item from one place to another on the planogram by way of the user clicking on and dragging the item in the planogram 403 in the second portion of the user interface in FIG. 4B. In some embodiments, the planogram generation module 205 instructs the user interface module 207 to provide a visualization of the relationship between two corresponding items on the planogram and the realogram. For example, in FIG. 4B, if the user selects the recognition "Y gel" 407a in the realogram 401, the item "Y Gel" 407b corresponding to the recognition 407a placed in the planogram 403 is identified. The recognition 407a in the realogram 401 and the item 407b in the planogram are respectively highlighted to visually represent the relationship between them. Even if the items are moved around in the planogram, the relationship between the items in the planogram and the recognitions in the realogram is still maintained. It should be understood that the highlighting of the relationship can be possible with any kind of visual indicator.

In some embodiments, the planogram generation module 205 receives a user request to associate an item selected from the product database with a gap in the planogram. The planogram generation module 205 updates the planogram by placing the selected item into the gap in the planogram. For example, in FIG. 4B, there is a gap 409a in the realogram 401. This gap 409a can be traced back to an unrecognized item 310 in the realogram 302 of FIG. 3B. The user can fix this failed recognition of the item 310 by browsing the tabular representation of the database 405 as shown in FIG. 4C to identify the correct recognition and fill the corresponding gap in the planogram 403 with a correct item. In FIG. 4C, the user selects the entry 411 for "A1 Fresh" in the database 405 and drags it to the gap 409b in the planogram 403 in FIG. 4B. This action translates to placing an image of the selected item into the gap 409b within the planogram 403. The planogram generation module 205 associates the gap 409b with the selected item and stores the newly created relationship between the item in the planogram 403 and the unrecognized object in the realogram 401.

In some embodiments, the planogram generation module 205 sends data including the planogram to the user interface module 207. In other embodiments, the planogram generation module 205 stores the data including the planogram in the data storage 243.

The user interface module 207 may include software and/or logic for providing user interfaces to a user. In some embodiments, the user interface module 207 receives instructions from the image processing module 203 to generate a user interface of the realogram on the display of the client device 115. For example, in one embodiment, the realogram may be displayed on the user interface with each of the recognized items on the shelves highlighted with a colored region of interest indicator around the recognized items. It should be understood that the indication of a region of interest can be possible with any kind of visual indicator. In another embodiment, the realogram may be displayed on the user interface with individual recognized items in their relative positions and all non-recognized items (e.g., shelf frame, price tags, non-recognizable product, etc.) hidden or removed. In yet another embodiment, the realogram may be displayed on the user interface with corresponding product images from a database substituted into the regions of interest corresponding to recognized items. In some embodiments, the user interface module 207 receives instructions from the planogram generation module 205 to generate a graphical user interface of the planogram on the display of the client device 115. In some embodiments, the user interface module 207 generates graphical user interface for displaying the product database as a tabular representation for browsing by the user. In other embodiments, the user interface module 207 sends graphical user interface data to an application (e.g., a browser) in the client device 115 via the communication unit 241 causing the application to display the data as a graphical user interface.

Figure 5:
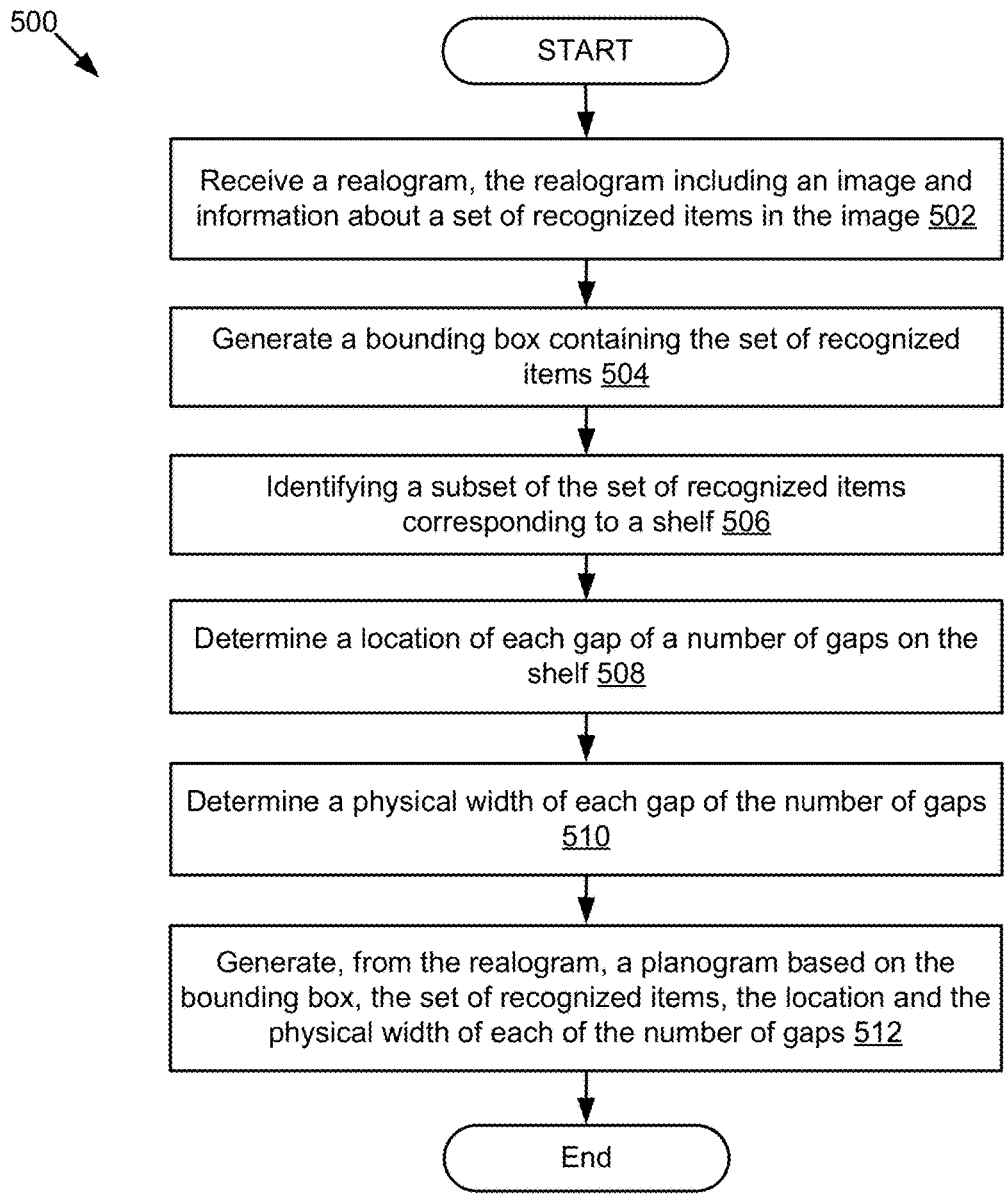
FIG. 5 is a flow diagram illustrating one embodiment of an example method for generating a representative planogram from a realogram of items on shelves.

FIG. 5 is a flow diagram illustrating one embodiment of a method 500 for generating a representative planogram from a realogram of items on shelves. At 502, the image processing module 203 receives a realogram, the realogram including an image and information about a set of recognized items in the image (e.g., from a client device 115). In some embodiments, the planogram generation module 205 may receive information identifying products or items in an image (e.g., product identification and location information) and the step 502 may be omitted. At 504, the planogram generation module 205 generates a bounding box containing the set of recognized items. For example, the planogram generation module 205 generates a bounding box that is a geometric union of the regions of interest of the set of recognized items in the realogram. The bounding box is used to estimate the gaps at the ends of the shelf in the realogram and preserve the fidelity of the gaps in the representative planogram. At 506, the planogram generation module 205 identifies a subset of the set of recognized items corresponding to a shelf. The planogram generation module 205 may identify a plurality of facings (e.g., a stack of products on the shelf) using the image recognition results. The planogram generation module 205 may then identify one or more shelves (i.e., linear groups) corresponding to the plurality of facings. In some embodiments, the planogram generation module 205 may remove items in the facing leaving a single product representing the facing. In some embodiments, the planogram generation module 205 individually processes each shelf of the realogram for creating a representative planogram.

At 508, the planogram generation module 205 determines a location of each gap of a number of gaps on the shelf. For example, the planogram generation module 205 determines a location of a number of gaps before a first recognized item, among the subset of the set of recognized items, and following a last recognized item on the shelf. At 510, the planogram generation module 205 determines a physical width of each gap of the number of gaps. In some embodiments, the planogram generation module 205 determines a physical width of each gap of the number of gaps identified on the shelf in the realogram using a relative width and a corresponding physical width of one or more recognized items corresponding to the shelf. At 512, the planogram generation module 205 generates, from the realogram, a planogram based on the bounding box, the set of recognized items, the location and the physical width of each of the number of gaps.

Figure 6A:
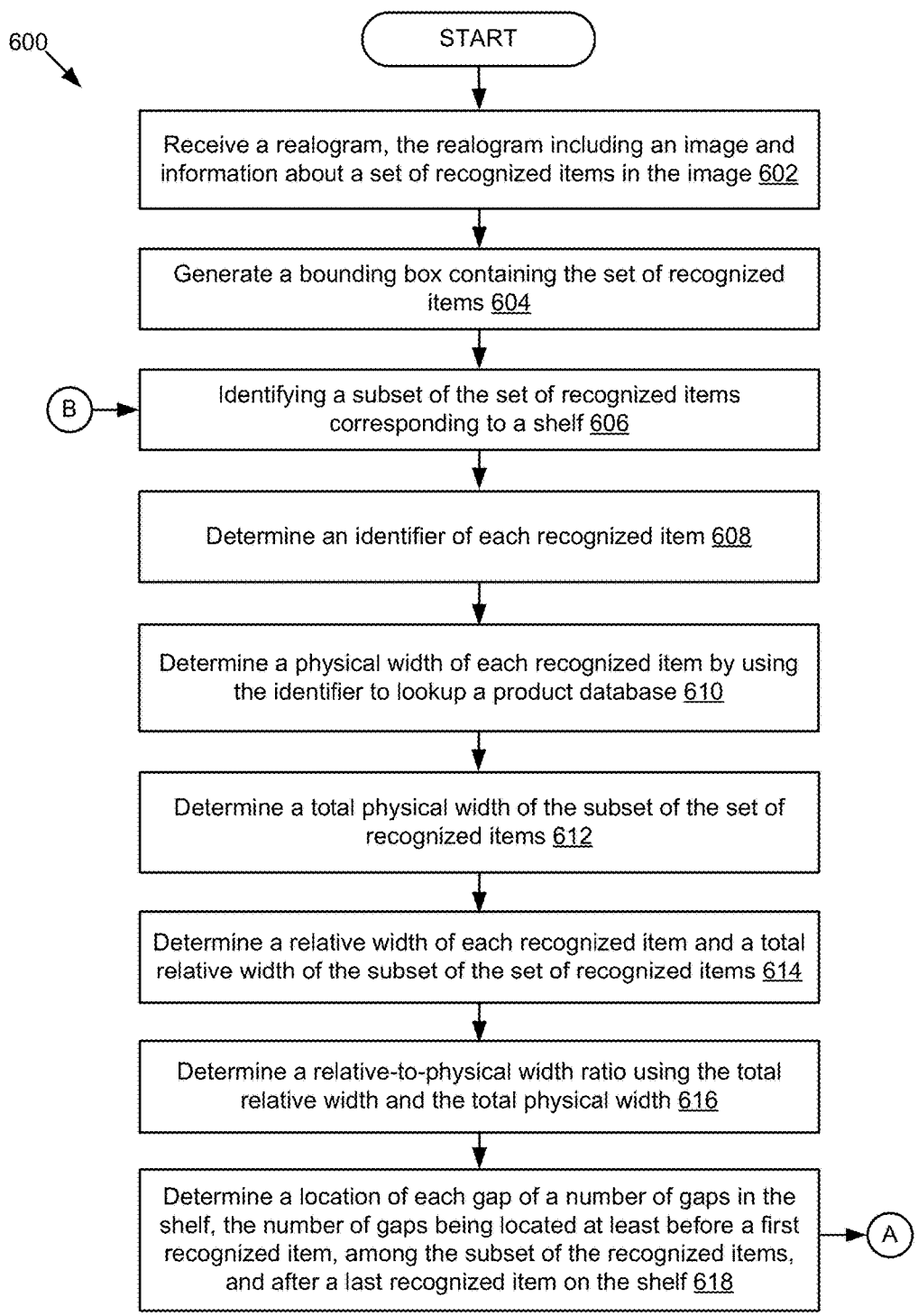
FIGS. 6A-6B are flow diagrams illustrating one embodiment of another example method for generating a representative planogram from a realogram of items on shelves.
Figure 6B:
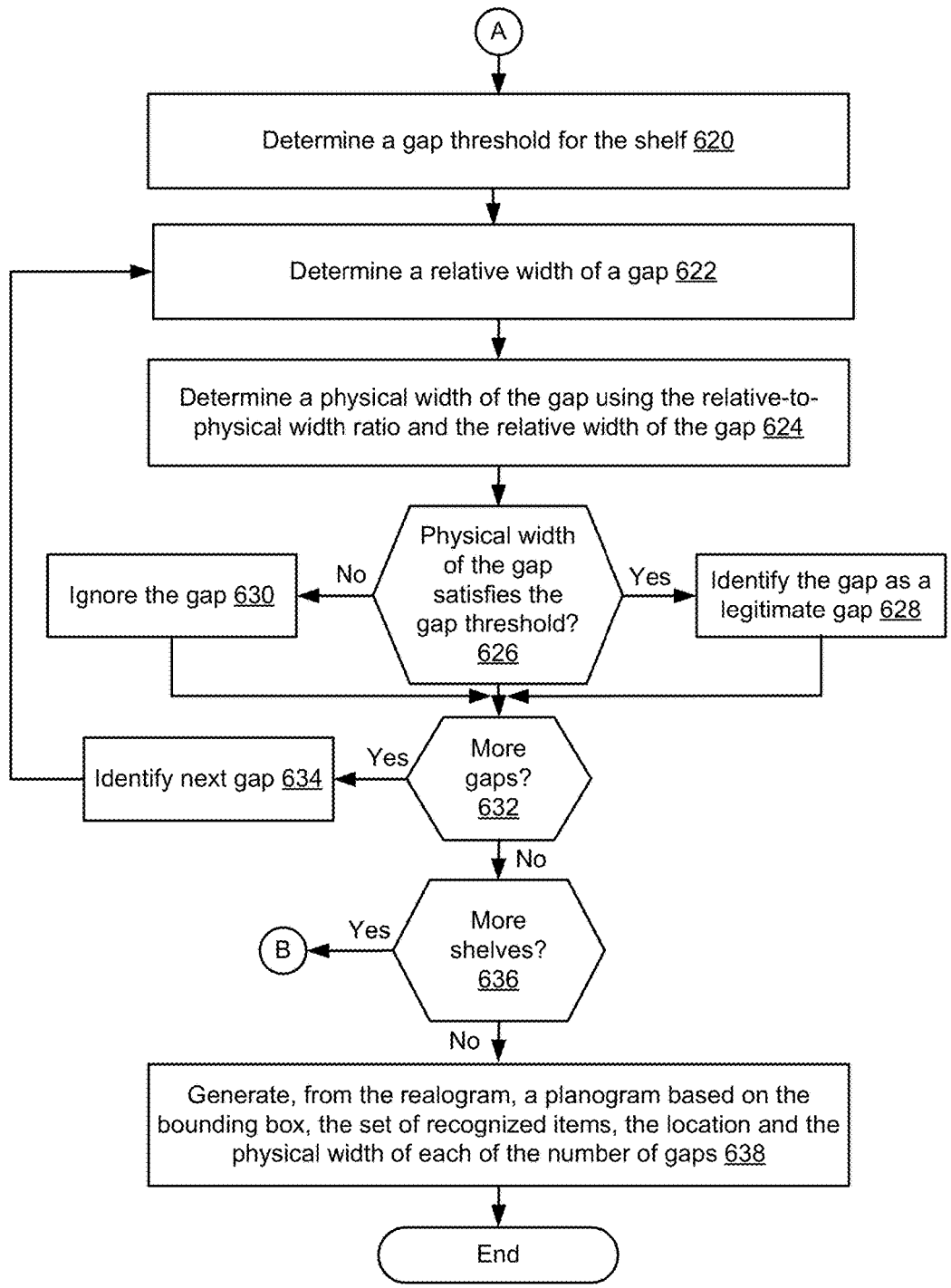

FIGS. 6A-6B are flow diagrams illustrating one embodiment of a method 600 for generating a representative planogram from a realogram of items on shelves. At 602, the image processing module 203 receives a realogram, the realogram including an image and information about a set of recognized items in the image (e.g., from a client device 115). At 604, the planogram generation module 205 generates a bounding box containing the set of recognized items. At 606, the planogram generation module 205 identifies a subset of the set of recognized items corresponding to a shelf. At 608, the planogram generation module 205 determines an identifier of each recognized item. For example, the planogram generation module 205 determines a UPC of each recognized item.

At 610, the planogram generation module 205 determines a physical width of each recognized item by using the identifier to lookup a product database. At 612, the planogram generation module 205 determines a total physical width of the subset of the set of recognized items. At 614, the planogram generation module 205 determines a relative width of each recognized item and a total relative width of the subset of the set of recognized items. At 616, the planogram generation module 205 determines a relative-to-physical width ratio using the total relative width and the total physical width. At 618, the planogram generation module 205 determines a location of each gap of a number of gaps in the shelf, the number of gaps being located at least before a first recognized item, among the subset of the recognized items, and after a last recognized item on the shelf. For example, the planogram generation module 205 determines a location of a gap between a left edge of the bounding box and a left edge of the first recognized item on the shelf. In another example, the planogram generation module 205 determines a location of a gap between a right edge of a last recognized item on the shelf and a right edge of the bounding box. In yet another example, the planogram generation module 205 determines locations of a plurality of gaps among the subset of the set of recognized items that are intermediate between the first recognized item and the last recognized item on the shelf.

At 620, the planogram generation module 205 determines a gap threshold for the shelf. In some embodiments, the planogram generation module 205 determines the gap threshold as a percentage of the average physical width. For example, the gap threshold may be 30 percent to 50 percent of the average physical width of the items on the shelf. At 622, the planogram generation module 205 determines a relative width of a gap. At 624, the planogram generation module 205 determines a physical width of the gap using the relative-to-physical width ratio and the relative width of the gap. At 626, the planogram generation module 205 determines whether the physical width of the gap satisfies the gap threshold. If the physical width of the gap satisfies the gap threshold, at 628, the planogram generation module 205 identifies the gap as a legitimate gap, and the method 600 forwards the process to 632. If the physical width of the gap does not satisfy the gap threshold, at 630, the planogram generation module 205 ignores the gap, and the method 600 forwards the process to 632. For example, the legitimate gap may be a gap that corresponds to a missing item or an unrecognized item on the shelf.

At 632, the planogram generation module 205 determines whether there are more gaps. If there are more gaps, at 634, the planogram generation module 205 identifies the next gap, and the method 600 repeats the process at 622. If there are no more gaps, at 636, the planogram generation module 205 determines whether there are more shelves in the realogram to process. If there are more shelves, the method 600 repeats the process at 606. If there are no more shelves, at 638, the planogram generation module 205 generates, from the realogram, a planogram based on the bounding box, the set of recognized items, the location and the physical width of each of the number of gaps.

A system and method for generating a planogram has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, from an image processing module, a realogram, the realogram including an image and information about a set of recognized items in the image;
   generating a bounding box containing the set of recognized items;
   identifying a subset of the set of recognized items corresponding to a shelf;
   determining a location of each gap of a number of gaps on the shelf;
   determining a physical width of each gap of the number of gaps; and
   generating, from the realogram, a planogram by preserving the location and the physical width of each gap of the number of gaps and horizontally and inwardly moving the subset of the set of recognized items such that a vertical edge of the subset of the set of recognized items occupy non-overlapping positions within the bounding box.

2. The method of claim 1, wherein determining the location of each of the number of gaps on the shelf comprises:
   determining a first location of a first gap between a left edge of the bounding box and a left edge of a first recognized item; and
   determining a second location of a second gap between a right edge of a last recognized item and a right edge of the bounding box.

3. The method of claim 2, wherein determining the location of each of the number of gaps on the shelf comprises:
   determining locations of a plurality of gaps among the subset of the set of recognized items that are intermediate between the first recognized item and the last recognized item.

4. The method of claim 3, further comprising:
   determining a relative width of each item of the subset of the set of recognized items, the relative width being expressed in units relative to the image;
   determining a total relative width by summing the relative width of each item of the subset of the set of recognized items;

determining a unique identifier of each item of the subset of the set of recognized items;
determining a physical width of each item of the subset of the set of recognized items by using the unique identifier to look up a product database;
determining a total physical width by summing the physical width of each item of the subset of the set of recognized items; and
determining a relative-to-physical width ratio based on the total relative width and the total physical width.

5. The method of claim 4, wherein determining the physical width of each gap of the number of gaps comprises:
determining a relative width of each gap of the number of gaps, the relative width being expressed in units relative to the image; and
determining the physical width of each gap of the number of gaps using the relative-to-physical width ratio and the relative width of each gap of the number of gaps.

6. The method of claim 5, further comprising:
determining a gap threshold for the shelf;
identifying a gap from the number of gaps;
determining whether the physical width of the gap satisfies the gap threshold; and
responsive to determining that the physical width of the gap satisfies the gap threshold, identifying the gap as a legitimate gap corresponding to a missing item or an unrecognized item.

7. The method of claim 6, wherein the gap threshold for the shelf is based on an average physical width of the subset of the set of recognized items.

8. The method of claim 6, further comprising:
generating a first portion of a user interface for displaying the realogram;
generating a second portion of the user interface for displaying the planogram;
generating a third portion of the user interface for displaying a tabular representation of the product database;
receiving, on the user interface, a user input for associating an item from the tabular representation of the product database with the gap in the planogram; and
updating the planogram by associating the gap with the item responsive to the user input.

9. A system comprising:
one or more processors; and
a memory, the memory storing instructions, which when executed cause the one or more processors to:
receive a realogram, the realogram including an image and information about a set of recognized items in the image;
generate a bounding box containing the set of recognized items;
identify a subset of the set of recognized items corresponding to a shelf;
determine a location of each gap of a number of gaps on the shelf;
determine a physical width of each gap of the number of gaps; and
generate, from the realogram, a planogram by preserving the location and the physical width of each gap of the number of gaps and horizontally and inwardly moving the subset of the set of recognized items such that a vertical edge of the subset of the set of recognized items occupy non-overlapping positions within the bounding box.

10. The system of claim 9, wherein to determine the location of each of the number of gaps on the shelf, the instructions further cause the one or more processors to:
determine a first location of a first gap between a left edge of the bounding box and a left edge of a first recognized item; and
determine a second location of a second gap between a right edge of a last recognized item and a right edge of the bounding box.

11. The system of claim 10, wherein to determine the location of each of the number of gaps on the shelf, the instructions further cause the one or more processors to:
determine locations of a plurality of gaps among the subset of the set of recognized items that are intermediate between the first recognized item and the last recognized item.

12. The system of claim 11, wherein the instructions further cause the one or more processors to:
determine a relative width of each item of the subset of the set of recognized items, the relative width being expressed in units relative to the image;
determine a total relative width by summing the relative width of each item of the subset of the set of recognized items;
determine a unique identifier of each item of the subset of the set of recognized items;
determine a physical width of each item of the subset of the set of recognized items by using the unique identifier to look up a product database;
determine a total physical width by summing the physical width of each item of the subset of the set of recognized items; and
determine a relative-to-physical width ratio based on the total relative width and the total physical width.

13. The system of claim 12, wherein to determine the physical width of each gap of the number of gaps, the instructions further cause the one or more processors to:
determine a relative width of each gap of the number of gaps, the relative width being expressed in units relative to the image; and
determine the physical width of each gap of the number of gaps using the relative-to-physical width ratio and the relative width of each gap of the number of gaps.

14. The system of claim 13, wherein the instructions further cause the one or more processors to:
determine a gap threshold for the shelf;
identify a gap from the number of gaps;
determine whether the physical width of the gap satisfies the gap threshold; and
in response to determining that the physical width of the gap satisfies the gap threshold, identify the gap as a legitimate gap corresponding to a missing item or an unrecognized item.

15. A computer program product comprising a non-transitory computer readable medium storing a computer readable program, wherein the computer readable program when executed on a computer causes the computer to:
receive a realogram, the realogram including an image and information about a set of recognized items in the image;
generate a bounding box containing the set of recognized items;
identify a subset of the set of recognized items corresponding to a shelf;
determine a location of each gap of a number of gaps on the shelf;

determine a physical width of each gap of the number of gaps; and generate, from the realogram, a planogram by preserving the location and the physical width of each gap of the number of gaps and horizontally and inwardly moving the subset of the set of recognized items such that a vertical edge of the subset of the set of recognized items occupy non-overlapping positions within the bounding box.

16. The computer program product of claim 15, wherein to determine the location of each of the number of gaps on the shelf, the computer readable program when executed on the computer further causes the computer to:

determine a first location of a first gap between a left edge of the bounding box and a left edge of a first recognized item; and determine a second location of a second gap between a right edge of a last recognized item and a right edge of the bounding box.

17. The computer program product of claim 16, wherein to determine the location of each of the number of gaps on the shelf, the computer readable program when executed on the computer further causes the computer to:

determine locations of a plurality of gaps among the subset of the set of recognized items that are intermediate between the first recognized item and the last recognized item.

18. The computer program product of claim 17, wherein the computer readable program when executed on the computer further causes the computer to:

determine a relative width of each item of the subset of the set of recognized items, the relative width being expressed in units relative to the image;

determine a total relative width by summing the relative width of each item of the subset of the set of recognized items;

determine a unique identifier of each item of the subset of the set of recognized items;

determine a physical width of each item of the subset of the set of recognized items by using the unique identifier to look up a product database;

determine a total physical width by summing the physical width of each item of the subset of the set of recognized items; and determine a relative-to-physical width ratio based on the total relative width and the total physical width.

19. The computer program product of claim 18, wherein to determine the physical width of each gap of the number of gaps, the computer readable program when executed on the computer further causes the computer to:

determine a relative width of each gap of the number of gaps, the relative width being expressed in units relative to the image; and determine the physical width of each gap of the number of gaps using the relative-to-physical width ratio and the relative width of each gap of the number of gaps.

20. The computer program product of claim 19, wherein the computer readable program when executed on the computer further causes the computer to:

determine a gap threshold for the shelf;

identify a gap from the number of gaps;

determine whether the physical width of the gap satisfies the gap threshold; and in response to determining that the physical width of the gap satisfies the gap threshold, identify the gap as a legitimate gap corresponding to a missing item or an unrecognized item.

* * * * *